Patented June 23, 1942

2,287,110

UNITED STATES PATENT OFFICE 2,287,110

ART OF MANUFACTURING LUBRICATING OILS

Eugene Lieber, Linden, N. J., assignor to Standard Oil Development Company, a corporation of Delaware No Drawing. Application December 29, 1938, Serial No. 248,234

7 Claims. (Cl. 252—52)

The present invention relates to the art of manufacturing lubricating oils, and more specifically to addition agents capable of reducing the pour points of waxy lubricating oils, and to waxy lubricating oils containing such addition agents. The invention will be fully understood from the following description.

Addition agents for lubricating oils have been made by condensation of chlorides of long chain fatty acids with aromatic hydrocarbons in the presence of relatively large amounts of aluminum chloride. These materials which are described as aryl alkyl ketones have been proposed as agents for increasing the oiliness and adherence of oils to bearing surfaces. Examination of a large number of these compounds shows that many of them have little or no wax modifying qualities and in consequence are of small effect in reducing the pour point of waxy lubricating oils.

The present invention relates to a method for greatly increasing the pour depressing potency of these aryl alkyl ketones and comprises a process in which the said ketones are recondensed with short chain dihalo compounds. The short chain compounds which are used in this connection are preferably halogenated hydrocarbons containing from 1 to 5 carbon atoms, such as dichlor methane, ethylene dichloride, propylene dichloride and the like, as well as the corresponding bromine, fluorine and iodine compounds. Among the various compounds that can be used, the chlorine derivatives are the cheapest, the most readily available and give the most satisfactory products, and among these ethylene dichloride is to be preferred.

The aryl alkyl ketones employed as the other reactant in the present process are characterized by the following structural formula:

where R is a cyclic radical and R' is an aliphatic radical containing six or more carbon atoms either open chain or cyclic. Among the various cyclic radicals that can be employed may be mentioned, first, the aromatic radicals of the simple ring type such as phenyl, diphenyl, and alkylated phenyl radicals such as tolyl and xylyl. Condenser ring aromatic radicals may also be employed such as naphthyl or anthryl, or the alkylated compounds of such radicals, for example, methyl or ethyl naphthyl. Hydroaromatic radicals may be employed as well, such as tetra-hydro naphthyl. It will be understood that any of these radicals may be employed in the ketone in which the other radical is a hydrocarbon group of at least six carbon atoms. Other cyclic radicals which may be used are the various hydrocyclic radicals such as furfuryl, fluoryl, carbozyl and the like. The aliphatic radicals are preferably saturated such as hexyl, heptyl, octyl, nonyl and higher such as heptadecyl, but unsaturated open chain aliphatic radicals may also be employed as well as aliphatic cyclic radicals such as found in the naphthenic acid and alcohols.

In the condensation, the two reactants are ordinarily used in about equal weight and are mixed with or without a solvent such as naphtha, kerosene or an inert halogenated solvent such as tri or tetrachlor ethane, carbon disulfide or the like. The condensation is effected by the use of catalysts such as aluminum chloride, boron fluoride and their known equivalents. The catalyst is preferably added to the mixture of the two reactants and while the proportion may vary, it is found that as little as .10 mol catalyst per mol of the dihalo compound is satisfactory. The temperature may vary over a considerable range, for example, from about room temperature up to about 150° F., but it is preferred to use a temperature from about room temperature to 125 or 130° F. The ingredients should be stirred during the reaction during which large volumes of hydrogen chloride gas are evolved. Ordinarily an hour or two is satisfactory for the reaction, but the various factors of time, temperature, catalyst and the amount thereof are not totally independent so that one or more may be varied over a rather wide range if compensation is made in other factors. The product is recovered from the reaction mixture by first diluting with a large volume of solvent such as kerosene or naphtha and hydrolyzing the catalyst with water or alcohol, but preferably with a mixture of water and alcohol which settles as a layer from the oil and contains the hydrolyzed products of the catalyst. The oily material is withdrawn and subjected to distillation up to a temperature around 600° F., which effects the removal of the solvent and lower boiling products which are not very effective from the wax modifying standpoint and the desired product is collected as the distillation residue.

The product is a viscous, green to brown oil; the color is good and while it may darken light oils to some extent, it is a satisfactory shade, characteristic of high grade petroleum oils. When this material is added to a waxy lubricating oil in proportion of ½ to 5%, a marked depression in the pour point is obtained. The exact amount of the material to be added depends on the particular ketone and dihalo aliphatic compound employed in the manufacture, and likewise on the particular oil in which the material is used, as well as the degree of pour depression desired. The product may also be employed as a dewaxing aid in about the same amounts disclosed above and as an ingredient in various compositions containing wax where it is desired to modify the crystal structure.

Example I

A series of heptadecyl aryl ketones were made up according to the following procedure. One molecular proportion of stearic acid was converted to the acid chloride by reacting with phosphorus trichloride on a water bath and the stearyl chloride was decanted from the aqueous phosphorus acid layer. The acid chloride was then added to a solution containing 1 molecular proportion of an aromatic hydrocarbon dissolved in several volumes of kerosene, the particular aromatic hydrocarbon depending on the particular ketone desired. Aluminum chloride was then added in slightly more than 1 molecular proportion and temperature raised while stirring to 200° F., which temperature was maintained for about 5 hours. The reaction mixture was cooled, diluted with an equal volume of kerosene and neutralized with alcohol and water. The sludge was settled and the kerosene layer distilled to 600° F. with fire and steam. These three ketones were then added to a waxy oil and the pour point determined.

| Sample | Pour point | |
|---|---|---|
| | 1% ketone | 5.0% ketone |
| | °F. | °F. |
| Oil+phenyl-heptadecyl ketone | 30 | 15 |
| Oil+naphthyl-heptadecyl ketone | 30 | 20 |
| Oil+xylyl-heptadecyl ketone | 30 | 20 |

From the above it will be seen that the ketones were very weak pour point depressants.

Example II

The three ketones prepared in Example I were then recondensed with ethylene dichloride using equal weights and 14 grams of AlCl₃ per 100 grams of the ketone. Condensation was effected by refluxing for 3 hours then diluting with kerosene, neutralizing with alcohol and water, decanting the kerosene layer and distilling to 600 to secure the desired product as a distillation residue. The yield of product varied from 77% to 88% based on the weight of ketone used and the product was a dark green, viscous oil.

These three products were then added to a waxy oil of 30° F. pour point with the following results:

| Sample | Pour point | |
|---|---|---|
| | 1% ketone | 5.0% ketone |
| | °F. | °F. |
| Oil+recondensed phenyl-heptadecyl ketone | −25 | |
| Oil+recondensed naphthyl-heptadecyl ketone | 0 | |
| Oil+recondensed xylyl-heptadecyl ketone | | −20 |

Example III

Phenyl heptadecyl ketone was recondensed with ethylene dichloride as in the previous example except that the proportion of catalyst was varied. The pour depressor was again tested in the 30° F. pour point oil.

| Gr. catalyst/100 gr. ketone | Yield/100 gr. ketone | Pour point | |
|---|---|---|---|
| | | 1% | 5.0% |
| | | °F. | °F. |
| 7 | 87 | −15 | −15 |
| 21 | 88 | −20 | −20 |
| 35 | 78 | −25 | +15 |

It will be seen that if more than 7 grams of catalyst is used the pour point depressor is independent of the amount used.

Example IV

Phenyl heptadecyl ketone was recondensed with an equal quantity of ethylene dichloride as before using 7 grams of catalyst per 100 grams of ketone but providing time of 8 hours refluxing instead of 3 hours as before. The pour depressing power was somewhat increased by the lesser time.

Example V

Heptadecyl naphthyl ketone was prepared as in Example I and was recondensed with an equal amount of ethylene dichloride using AlCl₃ and a reaction period of 8 hours. The product was recovered as before and 1% of the product in the 30° F. pour point oil reduced the same to −20° F.

Example VI

A phenyl-aliphatic ketone was made up by condensation of benzol with acid chlorides of mixed acids prepared by the low temperature oxidation of paraffin wax, the waxy acids being a cut having an average of 16 to 18 carbon atoms. 1% of this ketone when added to a waxy oil of 30° F. pour point reduced the same to +5° F. while 3% produced the same reduction.

This ketone was then recondensed with an equal quantity of ethylene distillate to 150 of the ketone at refluxing temperature for 3 hours, using 10 gr. AlCl₃ and the product separated as before. 1% of this product reduced the pour point of the oil to −20° F. and 5% to below −30° F.

In another series of experiments the recondensation was repeated with different amounts of catalyst. When 30 and 50 grams of catalyst were used 1% of the product reduced the pour points of the oil from +30 to below −30° F.

Example VII 100 grams of naphthenyl ketone of naphthalene were prepared by the procedure shown in Example I using naphthenic oils (acid No. 215) instead of stearic acid. This ketone was then recondensed with an equal quantity of ethylene dichloride using 10 grams of AlCl₃ at a reaction period of 3 hours. The product was separated as indicated in Example II and 82 grams were obtained. It was deep green and viscous.

1% of this product in the oil having an original pour point of 30° F. produced a depression to −5° F., whereas 1% of the original naphthenyl ketone produced no reduction whatever. 5% of the recondensed product showed a pour point of −20° F. whereas 5% of the original showed none whatever.

The experiment was repeated using 20 grams of AlCl₃ under the same conditions. 1% and 5% respectively in the waxy oil gave pour points of 0°F. and —15° F. respectively.

Example VIII

A naphthenyl ketone of benzene was produced and 100 grams were recondensed with 100 grams of ethylene dichloride using 7 grams of AlCl₃ for 3 hours. The product was finished as before and 5% in the waxy oil showed a depression in pour point from 30° F. to —15° F. whereas the ketone in 5% concentration showed a depression from +30° to +15° F.

The novel condensation products per se of this invention and the methods of preparing same are claimed in co-pending application Serial No. 418,325 filed November 8, 1941.

The present invention is not to be limited to any theory of the mechanism of the process nor to any particular reagents, catalysts and the like, but only to the following claims in which it is desired to claim all novelty inherent in the invention.

I claim:

1. A lubricating oil comprising a waxy hydrocarbon oil and a condensation product of a ketone having carbocyclic and open chain aliphatic radicals of at least 6 carbon atoms with a short chain dihalo aliphatic hydrocarbon of 1 to 5 carbon atoms.

2. A lubricant comprising a waxy hydrocarbon oil and a condensation product of a carbocyclic alkyl ketone having an alkyl radical of at least 6 carbon atoms with a dichlor aliphatic hydrocarbon of 1 to 5 carbon atoms.

3. Lubricating oil comprising a waxy hydrocarbon oil and a condensation product of a ketone containing an aromatic radical and an aliphatic radical of at least six carbon atoms with ethylene dichloride.

4. Lubricant comprising waxy lubricating oil and a condensation product of a ketone containing a naphthyl and an open chain alkyl radical of at least six carbon atoms with ethylene dichloride.

5. A lubricant comprising a mineral lubricating oil and a small amount of a condensation product of a ketone having the general formula RCOR' in which R is an aromatic group and R' is an alkyl group of at least 6 carbon atoms, with a halogenated hydrocarbon having the general formula $(CH_2)_n X_2$ where X is a halogen and $n$ is an integer from 1 to 5.

6. A lubricant comprising a hydrocarbon lubricating oil and a condensation product of phenyl hepta-decyl ketone with ethylene dichloride.

7. A lubricant comprising a major proportion of a waxy hydrocarbon lubricating oil and a small amount of a pour depressor which is a condensation product of a ketone having the general formula RCOR', in which R is a carbocyclic radical and R' is an alkyl radical of at least 6 carbon atoms, with a dihalo aliphatic hydrocarbon of 1 to 5 carbon atoms, said condensation product being obtained by the condensation of about equal weights of the ketone and the dichlor aliphatic hydrocarbon in the presence of aluminum chloride as catalyst at a temperature between the approximate limits of room temperature and about 150° F., followed by hydrolysis and removal of the catalyst and recovery of the pour depressant product as a distillation residue.

EUGENE LIEBER.